Jan. 31, 1967   TERUO FUJIHARA ETAL   3,300,959
CONTROL FOR AUTOMATED SPINNING MACHINE
Filed March 30, 1964   4 Sheets-Sheet 1

INVENTORS
TERUO FUJIHARA
YOSHIKAZU SUZUKI

Jan. 31, 1967    TERUO FUJIHARA ETAL    3,300,959
CONTROL FOR AUTOMATED SPINNING MACHINE
Filed March 30, 1964    4 Sheets-Sheet 2

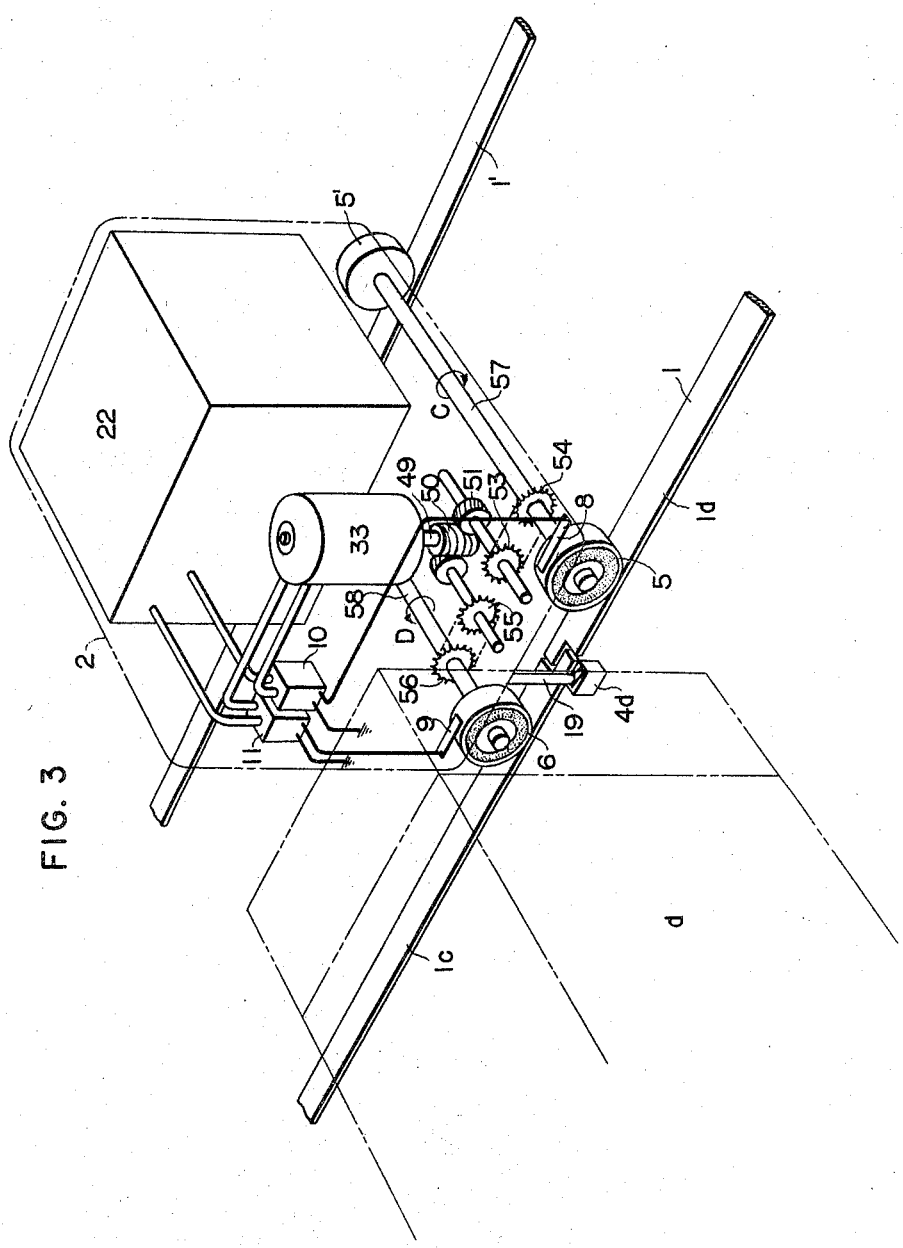

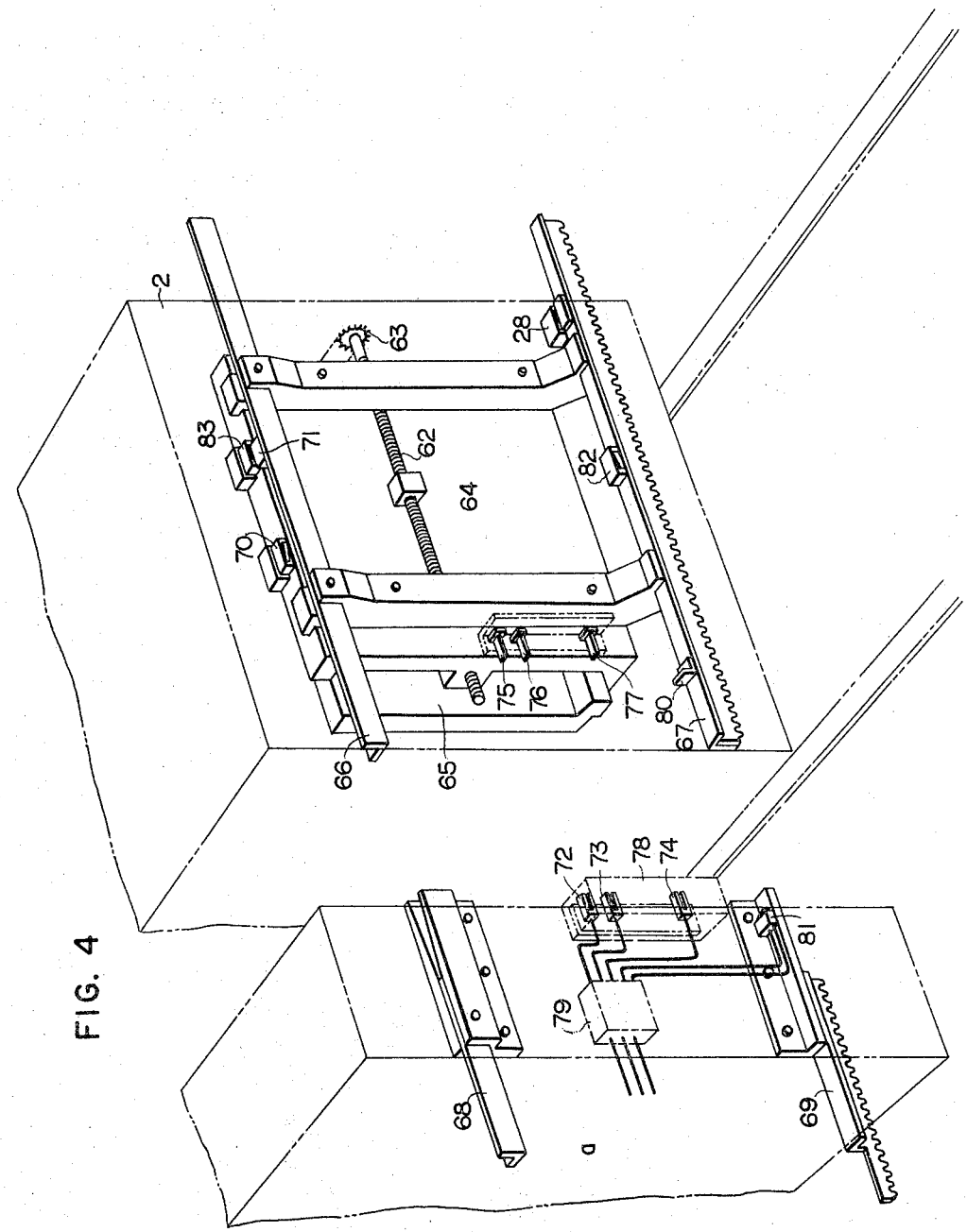

United States Patent Office 3,300,959
Patented Jan. 31, 1967

3,300,959
CONTROL FOR AUTOMATED SPINNING MACHINE
Teruo Fujihara, Osaka, and Yoshikazu Suzuki, Kariya, Japan, assignors to Toyoda Automatic Loom Works, Ltd., Kariya, Japan, and Kanegafuchi Boseki Kabushiki, Tokyo, Japan
Filed Mar. 30, 1964, Ser. No. 355,595
Claims priority, application Japan, Apr. 5, 1963, 38/18,315
3 Claims. (Cl. 57—53)

This invention relates generally to a control system for an automated spinning machine and more particularly to a control system for controlling an automatic device such as an automatic bobbin exchanger for use with an automated spinning machine.

Recently, the spinning industry demanded the adoption of fully automated machines for the purpose of automating operations.

Accordingly, an object of the invention is to provide a new and improved control system for controlling a carriage movable along a pair of rails disposed in parallel relationship on one side of a plurality of aligned spinning machines and equipped with an automatically operating device for use with the aligned spinning machines in such a manner, that in response to an operating condition of any one of the spinning machines the carriage is automatically moved to that spinning machine, the automatically operating device advances toward the associated spinning machine to perform the required operation, and then the carriage is ready for the succeeding operation.

Another object of the invention is to provide, in the control system as described in the preceding paragraph, improved electrical connector means through which the automatically operating devices on the carriage are supplied with electrical energy.

A further object of the invention is to provide, in the control system as described in the preceding paragraph, improved safety means for keeping accessible electrical components of electrical connector means through which the automatically operating devices on the carriage are electrically connected to the associated spinning machine, in a non-energized state when the automatically operating devices are not coupled to the associated spinning machine.

This invention will become more readily apparent from the following detailed description taken in conjunction with the accompanying drawings in which:

FIG. 3 is a perspective view of a drive for the carriage illustrated in FIG. 1; and FIG. 4 is a perspective view illustrating the manner in which a spinning machine is operatively connected to the carriage illustrated in FIG. 1 and a connector device through which an automatic device on the carriage is energized by an external source of alternating current.

While the invention may be applied to various automated machines the same is particularly suitable for use with automatic bobbin exchangers for spinning machines and accordingly will be so illustrated and described.

In the conventional type of automatic bobbin exchangers mounted on a carriage movable along one side of a plurality of spinning machines an operator has been required to operate a pushbutton switch or the like to move the carrier to the particular spinning machine on which the full bobbins should be exchanged for empty bobbins. After the carriage has reached that spinning machine the automatic bobbin exchangers are initiated to perform bobbin exchange. This invention contemplates to the improvement of such automatic bobbin exchangers to an extent that the spinning machines can be operated in an operate-less and fully automatic manner.

Figure 1:
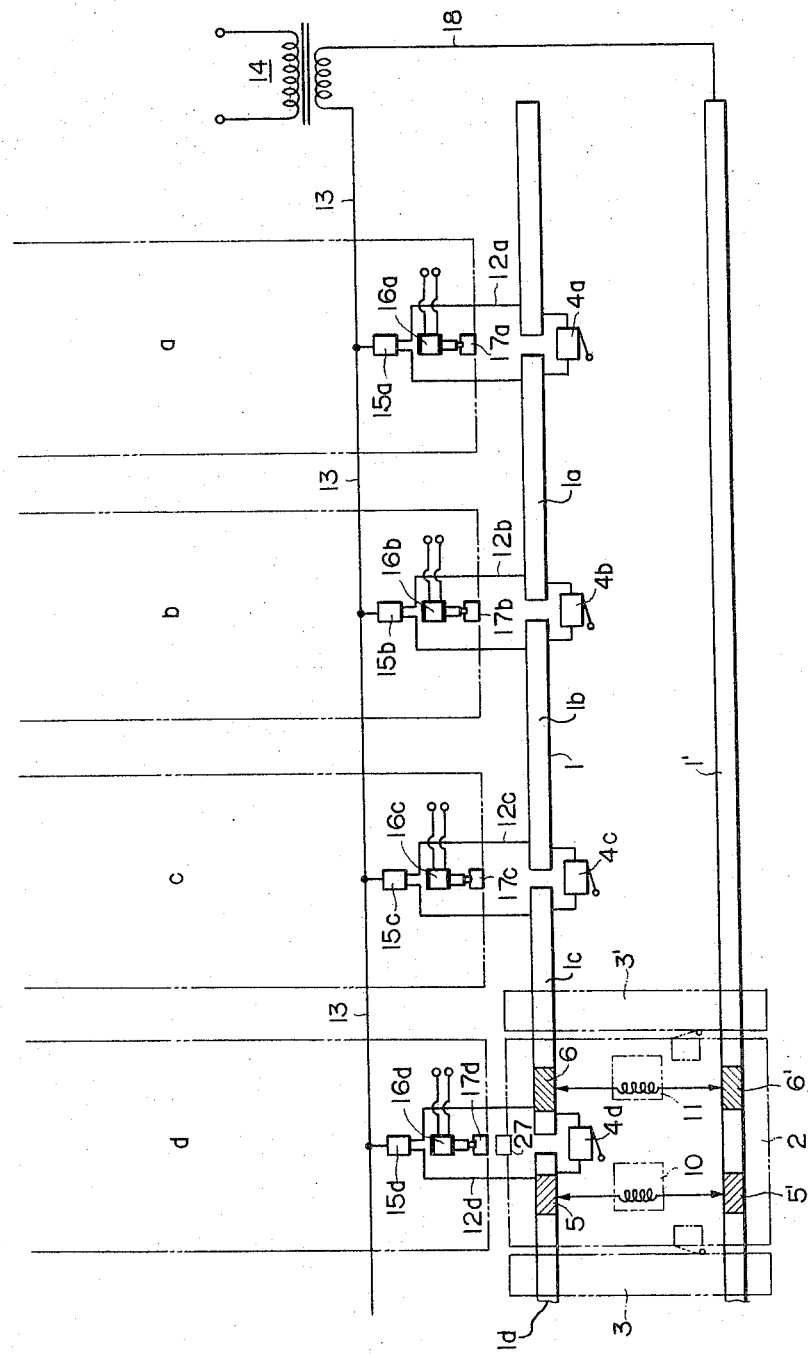
FIG. 1 shows schematically an electrical circuit of a control system for controlling a carriage for use with a plurality of automated spinning machines according to the teachings of the invention.

Referring now to FIG. 1 of the drawings, there is illustrated an electrical circuit of a control system according to the teachings of the invention. Vertical zones designated by the reference characters $a$, $b$, $c$ and $d$ and each confined by a pair of adjacent vertical dot-and-dash lines represent symbolically a plurality of aligned spinning machines to which the invention is applied. While four of the spinning machines are illustrated, any desired number of the machines other than that illustrated may be used, if desired. As shown in FIG. 1, a pair of guiding rails 1 and 1' are disposed in spaced parallel relationship on one side of a plurality of spinning machines $a$, $b$, $c$ and $d$, and a carriage 2 equipped with a pair of automatic bobbin exchangers 3 and 3' is adapted to be selectively movable to its operational position at which the automatic bobbin exchangers can be operated to exchange the finished cops or full bobbins for empty bobbin on the particular spinning machine facing the moved carriage. The guide rails 1 and 1' are made of any suitable electrically conductive material and one of the rails 1' remote from the spinning machines is continuous while the other rail 1 is composed of a plurality of rail portions 1$a$, 1$b$, 1$c$ and 1$d$ electrically separated from each other as by air gaps formed at positions each approximately corresponding to the middle point between ends of the associated spinning machine. Each pair of adjacent rail portions are electrically connected to each other by a normally closed rail switch such as a microswitch, 4$a$, 4$b$, 4$c$ or 4$d$. For example, the pair of rail portions 1$a$ and 1$b$ are electrically connected to each other by the rail switch 4$a$.

The carriage 2 is supported on the rails 1 and 1' through two pairs of wheels 5, 5', 6 and 6'. As shown in FIG. 3, the wheels 5 and 6 engaging the rail 1 are provided with respective contacts 8 and 9 contacting the outer peripheries thereof which are, in turn, electrically insulated from axles 57 and 58 for the wheels 5 and 6 respectively. The contacts 8 and 9 are electrically connected to the other rail 1' through starting relay coils 10 and 11, and the opposed wheels 5' and 6' respectively. Further the rail portions 1$a$, 1$b$, 1$c$ and 1$d$ are electrically connected through electrical conductors 12$a$, 12$b$, 12$c$ and 12$d$, normally open call switches such as microswitches 15$a$, 15$b$, 15$c$ and 15$d$ respectively and thence to a common electrical conductor 13 leading to a secondary winding of a step-down transformer 14. Thus it will be seen that any pair of adjacent rail portions such as 1$a$ and 1$b$ are connected to each other through the rail switch such as 4$b$, the call switch such as 15$b$ and a pair of the associated electrical conductors such as 12$b$. The transformer 14 includes a primary winding adapted to be energized by any suitable source of alternating current. The secondary winding of the transformer 14 is also connected to the rail 1' through an electrical conductor 18.

Since the electrical circuitry for each spinning machine is the same as that for many other spinning machine the circuitry will now be described in conjunction with the spinning machine a. The call switch 15a includes a pair of normally open contacts (not shown) capable of being simultaneously closed in response to an operating condition of the spinning machine a in which cops have been completed. Closing of these contacts effects the energization of the associated solenoid 16a to push a lug 17a mounted at the extremity of the solenoid, toward the guiding rail 1 (see, for example, a lug 17d shown in FIG. 1).

If the carriage 2 is assumed to be located in its operational position for the spinning machine d, closing of the call switch 15a completes a circuit from the secondary winding of the transformer 14 through the conductor 13, the closed switch 15a, the conductors 12a, a current path including the normally closed rail switch 4a, the rail portion 1a, the rail switch 4b, the rail portion 1b, the rail switch 4c and the rail portion 1c, the wheel 6, the starting relay coil 11, the wheel 6', the rail 1', the conductor 18 and back to the secondary winding. The circuit just described is hereinafter called a "rail" circuit. It is noted that a projection 19 (see FIG. 3) on the carriage 2 depresses the normally closed rail switch 4d to open the same to thereby allow energization of the starting relay 11 but to prevent energization of the starting relay 10. Upon energization the rail circuit acts to move the carriage 2 toward the spinning machine a in a manner as will be described hereinafter.

Figure 2:
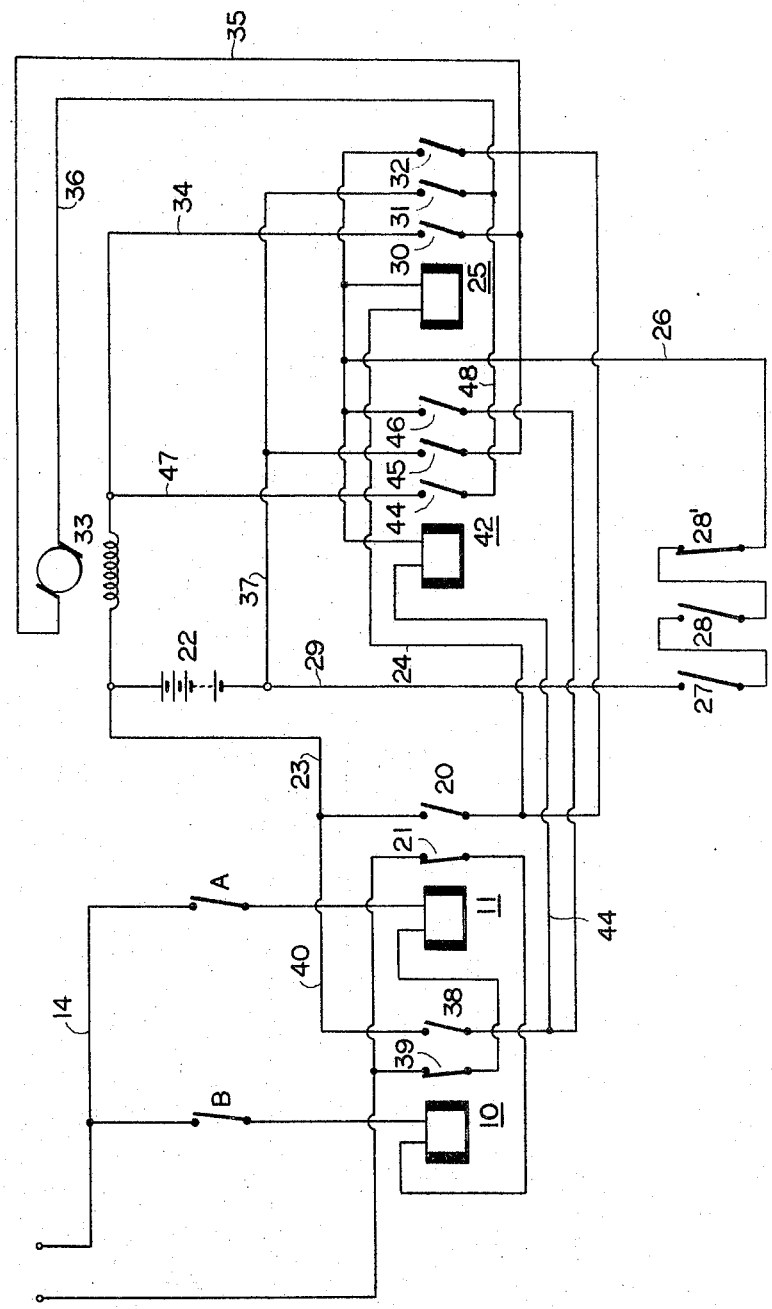
FIG. 2 shows the electrical circuitry within the carriage illustrated in FIG. 1.

Referring now to FIG. 2 of the drawings, there is illustrated the electrical circuitry for the carriage 2. For purposes of illustration, the term "rail circuit A" used hereinafter means a circuit such as the abovementioned rail circuit completed upon closing any one of the call switches such as 15a, 15b, 15c respectively for the spinning machines located to the right of the carriage 2, while the term "rail circuit B" used hereinafter means a similar circuit completed upon closing any one of call switches for spinning machines located to the left of the carriage. In FIG. 2, the rail circuit A is schematically shown as a switch A while the rail circuit B is schematically shown as a switch B. Each of the relays shown in FIG. 2 has operatively associated therewith a plurality of contacts, shown to the right thereof in the drawing. All the contacts are shown as being in the positions which they occupy when the associated relays are de-energized. For example, the relay 11 has a pair of contacts 20 and 21. When energized, the relay 11 causes the contact 20 to be closed and contact 21 to be opened in the conventional manner. Although the latter call switches and the associated spinning mcahines are not illustrated in FIG. 1 such call switches may be designated by the reference characters 15e, 15f and 15g beginning from one nearest to the carriage 2 located in its position illustrated in FIG. 1.

If the rail circuit A is completed then the starting relay 11 is energized to close its contact 20 and open a protective contact 21. Closing of the contact 20 completes a circuit from a source of direct current such as a battery 22 disposed on the carriage through a conductor 23, the closed contact 20, a conductor 24, an operating winding of a forward electromagnetic switch 25, a conductor 26, a normally closed stopping switch 28', protective microswitches 28 and 27, a conductor 29 and back to the battery. This causes the operating winding of the switch 25 to be energized to close its contacts 30, 31 and 32. Closing of the contacts 30, 31 and 32 completes a circuit for forwardly driving a direct current motor 33 by the battery 22. This circuit may be traced from one terminal of the battery 22 through a conductor 34, the closed contacts 30, a conductor 35, an armature for the motor 33, a conductor 36, the closed contacts 31, the conductor 37 and back to the battery. Therefore the direct current motor 33 is driven in the forward direction whereby the carriage begins to be moved to the particular spinning machine whose call switch has been closed.

On the other hand, opening of the contacts 21 of the relay 11 prevents the relay 10 from being energized when any one of the call switches for the spinning machines located to the left of the carriage as viewed in FIG. 1.

On the contrary, if the rail circuit B is completed the starting relay 10 is operated to close its contacts 38 and open its protective contacts 39. Thus a circuit is completed extending from the battery 22 through the conductor 23, a conductor 40, the closed contacts 38, a conductor 41, an operating winding of a reverse electromagnetic switch 42 and thence through the same components as those above described in conjunction with the forward drive of the motor and back to the battery. This causes the operating winding of the reverse electromagnetic switch 42 to be energized to effect closing of its contacts 44, 45 and 46. Therefore the direct current motor 33 will be energized by the battery through a conductor 47, the closed contacts 44, a conductor 48, the conductor 36, the conductor 35, the closed contacts 45 and the conductor 37. This permits the carriage 2 to be moved to the particular spinning machine having its call switch closed and located at the left of carriage as viewed in FIG. 1.

Opening of the contacts 39 of the relay 10 prevents the relay 11 from being energized when the relay 10 is in the energized state.

The closed contacts 32 and 46 serve to hold the associated electromagnetic switches 25 and 42 in their energized state even if the closed contacts 20 and 38 respectively of the starting relays 11 and 10 are opened. Namely, the contacts 32 and 46 act as self-holding contacts for the electromagnetic switches 25 and 42 respectively.

The normally closed stopping switch 28' mounted on the carriage 2 is adapted to be opened upon the same contacting any one of the lugs 17 pushed from its normal position to the rail 1 due to energization of the associated solenoid 16, during movement of the carriage. Also the serially connected protective switches 28 and 27 are normally closed and can be opened only when the carriage is being operatively coupled to one of the spinning machines as will be described hereinafter. From FIG. 2 it is to be noted that the direct current motor 33 on the carriage 2 can not be energized by the battery 22 unless both switches 28 and 27 are closed.

A mechanism for driving the carriage 2 will now be described with respect to FIG. 3 of the drawings. As shown, the direct current motor 33 includes a main shaft 49 having secured thereto a worm 50 engaging a pair of worm gears 51 and 52. The worm gears 51 and 52 serve to drive the wheels 5, 5' and 6, 6', in either of the directions of the arrows C and D illustrated in FIG. 3, through chain gearings 53, 54 and 55, 56 respectively.

It is assumed that the carriage 2 is positioned in front of the spinning machine d and that the call switch 15a is closed to indicate the completion of cops on that machine. Under the assumed conditions, the rail circuit A is energized to operate the starting relay 11 to thereby effect forward driving of the direct current motor 33 in the manner as previously described in the conjunction with FIG. 2. This causes the axle 58 to be rotated in the direction of the arrow D shown in FIG. 3. Thus the carriage 2 moves past the spinning machines c and b until it reaches the spinning machine a. It is recalled that closing of the call switch 15a causes energization of the solenoid 16a to advance the lug 17a toward the guiding rail 1 as previously described in conjunction with FIG. 1. The advanced lug 17a actuates the stopping switch 28' on the carriage 2 to open the same whereupon rotation of the direct current motor 33 is stopped. This allows the carriage to be stopped at its operational position for the spinning machine a. Under these circumstances the automatic bobbin exchanges 3 and 3' advance toward the spinning machine $a$ to exchange bobbins thereon. The manner in which the automatic bobbin exchangers 3 and 3' are operatively connected to the spinning machine $a$ will subsequently be described in conjunction with FIG. 4 of the drawings.

When the stopping switch 28' abutting against the advanced lug 17a is operated, in addition to stopping of the direct current motor 33, it produces a signal to drive an electric motor (not shown) which, in turn, drives a screw-threaded shaft 62 through a chain gearing 63 (see FIG. 4). Rotational movement of the shaft 62 causes a slide block 64 to slide along a base block 65 toward the spinning machine $a$. The slide block 64 includes a pair of relatively short rails 66 and 67 secured in parallel relationship to the upper and lower sides thereof and the spinning machine $a$ includes a pair of stationary rails 68 and 69 substantially aligned with the pair of rails 66 and 67 respectively. At the end of sliding movement as above described rails 66 and 67 on the slide block 64 contact the stationary rails 68 and 69 on the spinning machine $a$ whereupon a switch such as a microswitch 70 is actuated by a projection 71 to stop rotational movement of the shaft 62. At that time, an alternating current motor (not shown) mounted within the automatic bobbin exchangers 3 and 3' for advancing the same and effecting operation thereof is to be electrically connected to a source of alternating current (not shown). To this end, the spinning machine is provided with source terminals 72, 73 and 74 while the slide block 64 is provided with load terminals 75, 76, and 77 (see FIG. 4) adapted to engage the source terminals respectively upon contact of the movable rails 66 and 67 with the stationary rails 68 and 69 respectively. Thus it will be appreciated that, when the carriage 2 is operatively coupled to the spinning machine through engagement of the rails 66 and 67 with the rails 68 and 69 that the alternating current motor for the automatic bobbin exchanges 3 and 3' can be energized through the source and load terminals as above described.

In order to render the source terminals 72, 73 and 74 inaccessible an enclosure 78 is provided to enclose the same except for their front sides facing the load terminals. Thus the source terminals are accessible from the front sides and there is a danger that a person may receive an electric shock from the live source terminals. In order to prevent an operator from receiving an electric shock by the live source terminals, relay 79 is preferably connected between the source terminals and the source to normally prevent the terminals from being energized. The protective relay 79 is controlled by a switch such as a microswitch 81 controlled by a projection 80 secured on the movable rail 67. Immediately before the movable rails 66 and 67 engage the stationary rails 68 and 69 respectively, the projection 80 abuts against the switch 81 to operate the relay 79 whereby the source terminals 72, 73 and 74 are energized by the source. Therefore the alternating current motor for the automatic bobbin exchangers 3 and 3' is energized by the source through the now energized source terminals and the load terminal connected to the same to be rotated. This causes the automatic bobbin exchangers to advance toward the spinning machine $a$ to exchange bobbins with cops for new empty bobbins on the machine. After the completion of this exchange the automatic bobbin exchangers 3 and 3' will return to their original positions within the carriage 2 whereupon a portion of one of the bobbin exchangers closes a switch 82 to drive the screw-threaded shaft 62 in a direction to return the movable rails 66 and 67 to their original positions. After the rails 66 and 67 have returned to their original positions, the projection 71 closes a microswitch 83 to deenergize the motor for driving the shaft 62. Thus the carriage 2 is ready for the succeeding call.

As shown in FIG. 4, the normally closed protective switch 28 as previously described is secured on the movable rail 67 on one side of the carriage 2. Similarly a normally closed protective switch 27 is secured on a similar rail 67' (not shown) on the other side of the carriage. The operation of these protective switches is to prevent the direct current motor 33 from being driven in response to a call from any spinning machine other than the machine having its stationary rails in contact with the rails on the carriage.

After the automatic bobbin exchangers have returned to their original positions, the next succeeding call from another spinning machine, for example, the machine $d$ will serve to energize the rail circuit B for operating the reverse relay 10. Thus the direct current motor 33 is driven in the reverse direction to move the carriage 2 to its operational position for the machine $d$ where the operation as previously described in conjunction with the spinning machine $a$ is repeated.

What we claim is:

1. In a control system for controlling a carriage movable along a pair of guiding rails disposed in parallel relationship on one side of a plurality of aligned spinning machines and equipped with an automatically operating device for use with the spinning machines, said carriage including a pair of movable parallel rails capable of being operatively connected to a pair of stationary parallel rails disposed on each of the spinning machines, said automatically operating device advancing toward the associated spinning machine to perform the required operation after said pair of movable rails have been operatively connected to said pair of stationary rails, the combination of a call switch for each spinning machine responsive to an operating condition thereof to form an electrical rail circuit including those portions of said guiding rails located on that side of the carriage on which the spinning machine having its call switch operated is located, a pair of starting relays on said carriage included in said rail circuit, a driving motor disposed on said carriage, means for preventing one of said starting relays from operating during energization of the other relay, means including said driving motor to move said carriage to that spinning machine having its call switch operated, and means for automatically connecting said pair of movable rails to said pair of stationary rails at the moved position of said carriage.

2. In a control system for controlling a carriage movable along a pair of guiding rails disposed in parallel relationship on one side of a plurality of aligned spinning machines and equipped with an automatically operating device for use with the spinning machines, said carriage including a pair of movable parallel rails capable of being operatively connected to a pair of stationary parallel rails disposed on each of the spinning machines, said automatically operating device advancing toward the associated spinning machine to perform the required operation after said pair of movable rails have been operatively connected to said pair of stationary rails, the combination of a call switch for each spinning machine responsive to an operating condition thereof to form an electrical rail circuit including those portions of said guiding rails located on that side of the carriage on which the spinning machine having its call switch operated is located, a pair of starting relays on said carriage included in said rail circuit, a driving motor disposed on said carriage, means for preventing one of said starting relays from operating during energization of the other relay, means including said driving motor to move said carriage to that spinning machine having its call switch operated, means for automatically connecting said pair of movable rails to said pair of stationary rails at the moved position of said carriage, and means for supplying electrical power to said automatically operating device to automatically advance the same toward the associated spinning machine after the connection of said movable rails to said stationary rail.

3. The combination as claimed in claim 2, wherein said power supply means include a source terminal, and a relay electrically connected to said source terminal between the same and the source, said relay being operative to allow the electric power to be supplied to said automatically operating device only immediately before and during electrical connection of said movable rails to said stationary rails.

References Cited by the Examiner
FOREIGN PATENTS
908,981  10/1962  Great Britain.

FRANK J. COHEN, *Primary Examiner.*
J. PETRAKES, *Assistant Examiner.*